Figure 4:
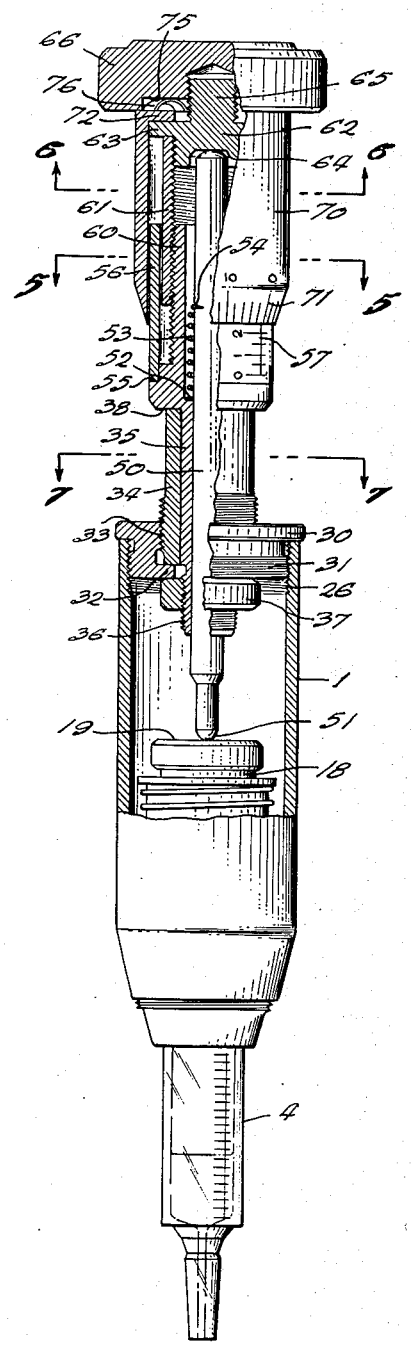

Nov. 24, 1953          H. RUF          2,660,342
BURETTE WITH VARIABLE CAPACITY
Filed April 1, 1949          2 Sheets-Sheet 1
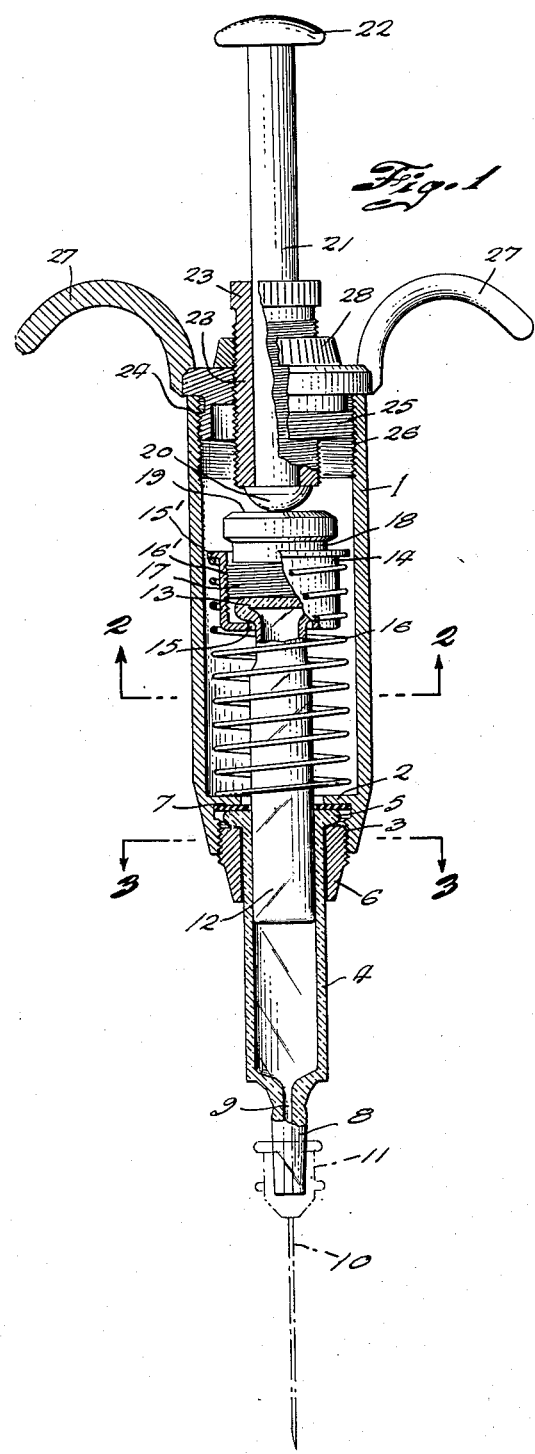
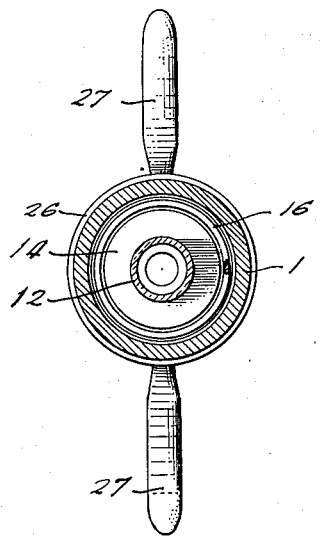
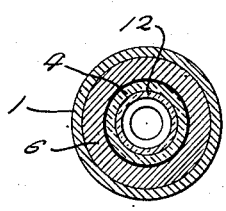
INVENTOR.
HERMAN RUF
BY
ATTORNEYS.

Nov. 24, 1953     H. RUF     2,660,342
BURETTE WITH VARIABLE CAPACITY

Filed April 1, 1949     2 Sheets-Sheet 2

INVENTOR.
HERMAN RUF
BY
*Sawyer & Kennedy*
ATTORNEYS.

Patented Nov. 24, 1953

2,660,342

UNITED STATES PATENT OFFICE 2,660,342

BURETTE WITH VARIABLE CAPACITY

Herman Ruf, Flushing, N. Y.

Application April 1, 1949, Serial No. 84,775

4 Claims. (Cl. 222—340)

This invention relates to improvements in burettes. More particularly, the invention is concerned with liquid measuring and dispensing devices adapted to handling and measuring small quantities of liquid accurately and without danger of contamination. Instruments of this character are used widely in chemical, biological and scientific work in general. Titration by adding small measured quantities to a solution until the required neutralization is attained is a typical use. So also is the addition of small quantities of reagents in chemical and microchemical work. Dilution to a standard degree, as in preparing blood count specimens and the like, for examination is another typical use of such instruments.

In such applications, a burette capable of rapid and accurate measuring and dispensing is desirable. In addition, the burette should be constructed so as to permit ready cleaning and so as to be fool-proof in operation by mechanically unskilled personnel.

It is an object of the present invention to provide a burette having improved characteristics of cleanliness, mechanical simplicity and reliability.

A further object of the invention is to provide a burette capable of extremely accurate measurement of very small quantities.

A further object of the invention is to provide a burette adapted both to the accurate measurement of small quantities of liquid and to the rapid measurement of relatively large quantities of liquid.

With these and other objects which will appear in the following full description in mind, the invention consists in the combinations and arrangements of parts and details of construction which will now first be fully described in connection with the accompanying drawing and will then be more particularly pointed out in the appended claims.

Figure 5:
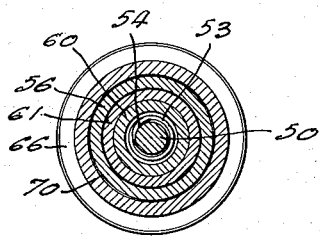
Figure 6:
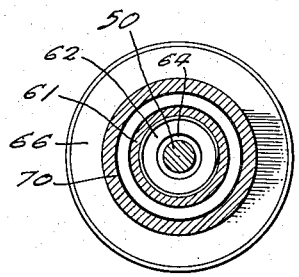
Figure 7:
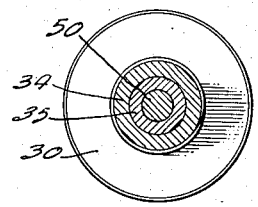

In the drawing:

Figure 1 is a view of a burette embodying the invention in a preferred form, the view being principally in central longitudinal section but showing certain parts partially broken away and in elevation;

Figures 2 and 3 are, respectively, sections on the lines 2 and 3 of Figure 1;

Figure 4 is a view partly in elevation and partly in central longitudinal section, showing a modified form of the device of Figure 1; and Figures 5, 6 and 7 are sections on the respective lines 5, 6 and 7 of Figure 4.

Referring now to Figures 1 to 3 inclusive, the burette comprises a generally cylindrical metal shell 1 which serves as an enclosure and support for the operating elements. The shell is formed with an internal annular flange 2 and an internally threaded opening 3. The burette cylinder proper 4 will normally be made of glass by reason of its transparency and desirable qualities of chemical inertness. The cylinder 4 is enlarged at its upper end so as to form a lip or flange 5, and a cylindrical retaining sleeve 6, which is threaded correspondingly to the internal threading 3, engages under the lip 5 for holding the cylinder 4 in the shell 1. A gasket or washer 7 of rubber or other suitable material is interposed between flange 5 and flange 2. The sleeve 6 has a central cylindrical bore fitting the cylinder 4 and holding the same in alignment. At its lower end the cylinder 4 terminates in a suitable nozzle 8 having a reduced central passage 9. Rubber or glass tubing, or hypodermic or similar needles may be inserted in the bore 9 or attached to the nozzle 8 in any convenient manner for facilitating the charging or discharging of the cylinder with a liquid. There is illustrated in the drawing, in phantom, a hypodermic needle 10 which is thus attached to the nozzle as by means of the rubber or similar fitting 11.

A cylindrical piston plunger 12 is slidably carried in the cylinder 4. The external surface of the piston 12 and the internal surface of the cylinder 4 will preferably be accurately ground or lapped together so as to avoid any leakage, while permitting a sufficiently free sliding movement for easy operation. Piston plunger 12 is preferably formed as a hollow cylindrical glass element, as indicated by the upper part thereof, which is shown in section, and its upper end is enlarged, as at 13. The enlarged upper end 13 of the plunger piston 12 is positioned within a cup-shaped member 14 having a bottom opening 15 large enough to accommodate the body of the plunger but smaller than the enlargement 13. A lip or abutment 15' is formed around the upper edge of the member 14 and is engaged by a spring 16 which seats against the upper surface of the annular flange 2 of the shell, as indicated. The inner wall of the member 14 is threaded as at 16' and receives the correspondingly threaded portion 17 of a plug 18. Plug 18 is provided with a finished, preferably flat, upper surface 19, which is engaged by the rounded, approximately hemispherical lower end 20, of an operating plunger 21, which terminates in a button 22 for convenient application of pressure by the thumb. The operating plunger 21 is slidably carried in a sleeve 23 which is externally threaded and is screwed into the correspondingly internally threaded cap member 24. The member 24 is also externally threaded as at 25, and is screwed into the internally threaded upper end 26 of the shell 2. Cap member 24 is formed with hook shaped wings or projections 27, under which the fingers may be placed for holding the burette while operating the plunger 21 by applying pressure with the thumb to button 22. A lock nut 28 serves to hold the parts in adjusted assembled relation.

In operation, the nozzle 8 or other fitting, such as the hypodermic needle 10, is inserted in the liquid with the operating plunger 21 pressed in so as to drive the piston plunger 12 down to the end of its stroke, and the plunger 21 is then released so as to permit spring 16 to force the piston 12 upwardly, thus sucking liquid into the cylinder 4. Any air within the cylinder may be vented by turning the device so that the nozzle points upwardly and pushing the plunger 21 so as to expel the air and a few drops of liquid, in the usual manner.

The cylinder 4 may be graduated, as indicated, in cubic centimeters or other convenient units so that the position of the end of the piston 12 within the cylinder may be read accurately and the operating plunger 21 may be pressed in to discharge an accurate quantity of liquid. The device will normally be built with a cylinder having an internal bore diameter of approximately one centimeter or half an inch, and the cylinder and scale thereon will be of length sufficient to handle two cubic centimeters of liquid or thereabouts. Wide variation in dimensions may, however, be made without departing from the invention.

The piston 12 is guided in its movement by the cylinder 4, its upper end abutting against the member 18 but not being laterally constrained thereby. The member 18, in turn, is pressed against the rounded end 20 of the operating plunger by the spring 16, but is not laterally constrained thereby, so that the entire piston mounting is a floating mounting, and any binding in its movement or need for high precision and grinding or lapping of the parts together, a part from the piston 12 and cylinder 4, is eliminated. Play between the enlargement 13 and the bottom of the cup 14 may be eliminated or reduced to any extent desired by screwing the member 18 into the cup. The upper limit of stroke of the piston may be adjusted as desired by loosening the lock nut 28 and turning the sleeve 23 until the desired position is achieved and thereafter tightening the nut 28 to hold the parts in position. The scale on the cylinder 4 may be of any convenient type, reading either upwardly or downwardly and may have a zero at any desired position, so that when the cylinder is vented of air it may be placed accurately at the zero point or other desired point of the scale. The measurement may be either of the amount of liquid taken into the cylinder or of an amount discharged therefrom by a full or partial stroke of the plunger 12.

The required cleaning of the device may ordinarily be done by operating the plunger 21 so as to flush the cylinder repeatedly. Where more complete cleaning than this is required, the cylinder may readily be removed by merely unscrewing the nut or sleeve 6, thus exposing all of the liquid-contacting surfaces. The entire device may be disassembled by someone having little or no mechanical skill by unscrewing the cap member 24, together with all parts carried thereby, and then dropping out the piston plunger 12, spring 16 and elements 14 and 18.

The device as just described is capacitated to handle quantities of the order of a cubic centimeter with an accuracy of the other of a fraction of one tenth cubic centimeter, the limit on the accuracy obtainable being principally that of practicality of reading fine divisions of the scale engraved or otherwise placed upon the cylinder 4. For more accurate work than this, the device of Figure 4 is preferred and the characteristic elements of that device may be made interchangeable with the upper structure of the embodiment of Figure 1.

As shown in Figure 4, the shell 2, cylinder 4, piston 12, spring 16 and members 14 and 18 may be the same as in the embodiment of Figure 1, a micrometer upper structure being substituted for the plunger 21 and associated parts. This micrometer upper structure is carried in a cap member 30 which is externally threaded as at 31 and screws into the internally threaded upper end 26 of the shell 1. Internally the nut 30 is formed with an annular flange 32 and a threaded upper bore 33. A micrometer is positioned with reference to the cap 30 by means of a sleeve 34 screwed into the threaded member 33, as indicated, and seating against the upper face of the flange 32. An inner sleeve 35 is mounted within the sleeve 34 and its lower end 36 is externally threaded, and carries a correspondingly threaded nut 37. Sleeve 35 is formed with a shoulder 38 above the outer sleeve 34, so that by turning up nut 37, the shoulder 38 may be pulled down against the outer end of sleeve 34, thus holding the parts securely together.

Inside sleeve 34 is slidably mounted a micrometer rod 50 which terminates in a rounded and substantially hemispherical head 51 engaging the upper finished surface 19 of the member 18. The central sleeve 35 fits the lower portion of the rod 50 closely but is enlarged toward its upper end to form a shoulder 52 against which seats a spring 53, the other end of which is fastened to the rod 50 as by inserting the end of the spring into a hole drilled in the rod, at 54. The spring 53 thus tends to force the rod 50 upwardly or outwardly and also resists rotation thereof. Externally the sleeve 35 is reduced to form a shoulder as at 55 on which is fitted and brazed or otherwise fastened a tubular shell 56 marked with graduations along the line 57, as indicated. Above the shoulder 55 the sleeve 35 is further reduced and is threaded as at 60. An internally threaded tubular element 61 is screwed over the threaded portion 60 of the sleeve 35 and receives a correspondingly threaded member 62 which is screwed into the tubular member 60 so that flange 63 formed on the member 62 seats against the end thereof. The member 62 is formed with an inner or lower socket 64 which receives the end of the micrometer rod 50. The upper portion 65 of the member 62 is of reduced diameter and is threaded, a correspondingly internally threaded operating knob 66 being screwed onto it. An outer shell 70 marked with a circumferential scale 71 is formed with an annular upper flange 72 which fits over flange 63 and under the knob 66, as indicated. Knob 66 has annular recesses 75 in which are placed springs 76 serving to couple the knob 66 and shell 70 frictionally together. Turning knob 66 will also turn elements 65, 61 and 70 thus screwing the element 61 further onto or further off the lower assembly and moving the rod 50 within the shell 1 so as correspondingly to move element 18 and the plunger 12 within the cylinder 4 for discharging or sucking in liquid. The threaded connections, other than the screw thread between elements 35 and 61, are made so as to hold firmly, the action upon turning of the knob 66 in either direction being accordingly confined to a relative movement of these two members. Shell 70 normally turns with the knob 66 but may be held against rotation while the knob is turned or may be turned while the knob is held stationary. This movement of shell 70 relative to knob 66 is utilized for zero adjustment. In operation, knob 66 is turned to force rod 50 inwardly or downwardly and to force the piston 12 down to or toward the limit of its stroke. The nozzle 8 or hypodermic needle or other connection attached thereto is now inserted in the liquid and knob 66 is spun backwardly so as to retract the plunger 12 and take in liquid. The instrument may now be turned upwardly and the knob may be operated to expel any air, so that the instrument is charged and ready for use. The amount of liquid discharged may be read off the scales without further adjustment. It is more convenient ordinarily, however, to turn the shell 70 relative to knob 66 and the rest of the instrument until the zero mark on the circumferential scale 70 lies upon line 57 on the shell 56. Knob 66 is now turned relative to the shell 1 for discharging the required quantity of liquid as indicated by the circumferential scale on the shell 70. In an instrument of the dimensions previously indicated, the parts may be of such size and the pitch of the micrometer thread may be such that one complete turn of knob 66 will correspond to a movement of the plunger 12 sufficient to discharge 50 cubic millimeters (.05 cc.).

The convenience of the micro-burette of Figure 4 for such work as titration or microchemistry will be evident. For example, the instrument may be loaded with liquid, set to zero and turned in successive steps as indicated by the circumferential scale for discharging one or more cubic millimeters at a step. When neutralization is achieved, the quantity dispensed may be read directly off the circumferential scale or if it exceeds 50 cc. may be read off this scale and the longitudinal scale 57. Where larger but accurately measured amounts are required, such amounts may be measured out closely and quickly by relatively unskilled personnel.

Since the shell 1, cylinder and piston rods are identical in the instruments of Figure 1 and Figure 4, the instrument according to Figure 1 may be converted into an instrument according to Figure 4 by merely unscrewing the cap 24 and parts carried thereby and screwing in cap 30 and parts attached thereto, thus converting the instrument almost instantaneously from a rapidly operable burette reading in tenths of a cubic centimeter off the scale of cylinder 4, into a micro-burette reading in cubic millimeters off the micrometer scale 71. This represents an increase in fineness of measurement by a factor of the order of one hundred times, which is obtainable by a practically instantaneous and very simple interchange of parts.

While the burette and micro-burette of Figures 1 to 4 are illustrated separately, it is contemplated that a burette operating assembly and micro-burette operating assembly will be utilized together with a common shell 1 and attached plunger and cylinder parts so that the shell 1 and attached cylinder together with an operating plunger assembly according to Figure 1 and a micrometer assembly according to Figure 4 constitute in effect a single instrument or set utilizable for a complete range of measurements ranging from one cubic millimeter to a thousand times this amount or more.

What is claimed is:

1. In a burette and in combination, an outer shell forming an enclosure and support for the operating elements, a cylinder supported therein and extending from one end thereof, a floating piston plunger slidably fitting in the cylinder and having one end extending therefrom into the shell, a piston plunger head on the end of the plunger which extends into the shell, the said head and plunger being spaced from the inner surface of the shell, a fitting comprising a cup-shaped member having a bottom aperture accommodating the piston plunger and a plug threadably mounted in the cup-shaped member for holding the piston plunger head therein, the plug having a flat upper surface, an operating plunger slidably carried in the shell, extending through the end thereof opposite the end which carries the cylinder and having a rounded end engaging the flat surface for forcing the piston plunger into the cylinder and a spring within the shell and outside the cylinder, one end of the spring engaging the cup-shaped member and the other end of the spring engaging the cylinder end of the outer shell for yieldably urging the piston plunger against the operating plunger.

2. A burette according to claim 1, in which the cup shaped member is formed with a peripheral flange for engagement by the spring.

3. In a burette and in combination, a cylinder and floating plunger slidably fitting therein, a frame structure carrying the cylinder, a fitting comprising a cup-shaped member having a bottom aperture accommodating the piston plunger and a plug threadably mounted in the cup-shaped member for holding the piston plunger head therein, the plug having a flat upper surface, an operating plunger slidably carried by the frame structure with one end extending therefrom for operation by a finger and having a rounded opposite end engaging the flat surface for forcing the piston plunger into the cylinder and a spring external to the cylinder and engaging the cup-shaped member at one end and the frame structure adjacent the cylinder at its other end for yieldably urging the piston plunger against the operating plunger.

4. A burette according to claim 3, in which the cup shaped member is formed with a peripheral flange for engagement by the spring.

HERMAN RUF.

References Cited in the file of this patent

UNITED STATES PATENTS

| Number | Name | Date |
| --- | --- | --- |
| 589,386 | Gerhard | Aug. 31, 1897 |
| 1,433,075 | Gottlieb | Oct. 24, 1922 |
| 2,244,952 | Kapelman | June 10, 1941 |
| 2,250,467 | Cole | July 29, 1941 |
| 2,354,649 | Brickner | Aug. 1, 1944 |
| 2,412,295 | Shaffer | Dec. 10, 1946 |

FOREIGN PATENTS

| Number | Country | Date |
| --- | --- | --- |
| 210,119 | Switzerland | June 15, 1940 |